United States Patent [19]

Tchernev

[11] Patent Number: 5,237,827
[45] Date of Patent: Aug. 24, 1993

[54] APPARATUS FOR CYCLIC PRODUCTION OF THERMAL ENERGY BY PLURAL ADSORPTION STATIONS AND METHODS

[76] Inventor: Dimiter I. Tchernev, 9 Woodman Rd., Chestnut Hill, Mass. 02167

[21] Appl. No.: 593,382

[22] Filed: Oct. 2, 1990

Related U.S. Application Data

[60] Continuation of Ser. No. 186,741, Apr. 25, 1988, abandoned, which is a continuation of Ser. No. 785,025, Oct. 7, 1985, abandoned, which is a continuation of Ser. No. 231,409, Feb. 4, 1982, abandoned, which is a continuation of Ser. No. 11,689, Feb. 12, 1979, Pat. No. 4,584,842, which is a continuation-in-part of Ser. No. 710,609, Aug. 2, 1976, Pat. No. 4,138,850, which is a division of Ser. No. 520,808, Nov. 4, 1974, Pat. No. 4,034,569.

[51] Int. Cl.$^5$ .............................................. F25B 17/00
[52] U.S. Cl. ..................................... 62/106; 62/235.1; 62/480
[58] Field of Search ................. 62/106, 112, 235.1, 62/480, 476

[56] References Cited

U.S. PATENT DOCUMENTS

| | | | |
|---|---|---|---|
| 1,559,223 | 10/1925 | Conill et al. | 62/112 X |
| 2,030,350 | 2/1936 | Bremser | 62/235.1 |
| 2,138,684 | 11/1938 | Altenkirch | 62/235.1 X |
| 2,293,556 | 8/1942 | Newton | 62/480 X |
| 2,293,556 | 8/1942 | Newton | 62/480 |

OTHER PUBLICATIONS

Desorption Cooling, Daunt et al, Cryogenics Jun. 1972.

Primary Examiner—William E. Wayner
Attorney, Agent, or Firm—Penrose Lucas Albright

[57] ABSTRACT

The use of molecular sieve zeolite for the effective utilization of low-grade heat sources such as solar energy. A system includes molecular sieve zeolite and a low pressure polar gaseous fluid adapted to be adsorbed by the zeolite which is in a closed container and circuit which includes a condenser and a gas expansion cooler member. When the container is heated, a gas is given off from the zeolite, cooled in a condenser, and thereafter expanded for cooling purposes. In one embodiment, the cooled gas is received in a further container having the zeolite therein and subsequently, upon cooling of the first container, the gaseous fluid may be returned thereto via again a condenser and gas expansion cooler member to provide further cooling. In another embodiment, zeolite is formed by sintering same to form a pressure resistant divider across the container. One side of the divider is heated to create a temperature gradient across the divider which functions as a heat energized pump for the adsorbed gaseous fluid, a pressure as well as temperature differential developes within the container across the divider whereupon the heated relatively pressurized gas, after giving up some of its energy in a circuit which may include a condenser and gas expansion member, is returned to the container to be again pressurized and heated by the action of the sintered zeolite divider. In a further embodiment, water vapor is adsorbed from a zeolite panel by solar heat during the day and condensed by cooling, and collected in a container, and at night, at a lower relative pressure, it evaporates and is readsorbed by the zeolite panel whereupon ice is formed in the container which collects the water during the day. In another embodiment, a solar heated liquid is circulated in series through heat exchangers in plurality of zeolite filled pressure vessels with intervening cooling coils for the liquid. Nitrogen in one of the vessels is expelled at high pressure through an engine to be adsorbed by a cooler low pressure heated vessel with valving cycling which vessel is at high pressure and which is at low pressure.

32 Claims, 6 Drawing Sheets

FIG. 8
$H_2O$ ON ZEOLITE TYPE A

FIG. 9 H₂O ON BPL ACTIVATED CARBON

FIG. 10 H₂O ON ASC WHETLERITE CARBON

APPARATUS FOR CYCLIC PRODUCTION OF THERMAL ENERGY BY PLURAL ADSORPTION STATIONS AND METHODS

RELATED APPLICATIONS

This is a continuation of U.S. application Ser. No. 186,741 filed Apr. 25, 1988, now abandoned, which is a continuation of U.S. application Ser. No. 785,025 filed Oct. 7, 1985, now abandoned, which is a continuation of U.S. application Ser. No. 231,409 filed Feb. 4, 1982, now abandoned, which is a continuation of U.S. appl. Ser. No. 011,689, filed Feb. 12, 1979, now U.S. Pat. No. 4,584,842 of Apr. 29, 1986, which is a continuation-in-part application of U.S. application Ser. No. 710,609, filed Aug. 2, 1976, U.S. Pat. No. 4,138,850, of Feb. 13, 1979, which is a divisional application of U.S. application Ser. No. 520,808, filed Nov. 4, 1974, U.S. Pat. No. 4,034,569 of Jul. 12, 1977.

BACKGROUND OF THE INVENTION

The present invention related to a system for the utilization of low-grade heat such as solar energy or the waste heat of a power generating plant by utilizing the large variation of the sorption capacity of molecular sieve zeolite. In particular, the system relates to a system which converts small variations in absolute temperature to relatively large variations in gas pressure which, in turn, is utilized to produce mechanical or electrical energy or cooling in refrigeration.

One of the primary difficulties which hinders the utilization of solar energy for heat and cooling purposes is its low energy density (less than 1.5 kilowatt per square meter) of solar energy on earth. The temperature differentials obtained with solar energy collectors are small and even when solar concentrators are used, temperatures above 200°–300° centigrade require sophisticated sun-following techniques. Thus, there is a need for improved efficient energy conversion at small temperature differentials, say between 30°–100° centigrade.

Those skilled in the art understand due to the low temperature differentials obtainable with solar energy, Carnot efficiency of any system using the normal expansion of gases is of necessity quite low. For this reason, most solar energy refrigeration systems have concentrated on the old, well proved absorption refrigeration cycle based on the change of the solubility of a gas in a liquid with temperature. Inasmuch as this process is thermally activated, its dependence on temperature is exponential which permits large changes of gas pressure for small changes in absolute temperature. This process has received new impetus by commercial use of systems other than the ammonia-water used in early gas refrigerators. For example, at Kennedy Airport, New York City, an air conditioning system is provided which utilizes lithium bromide and water as working fluids.

In all refrigeration solid adsorption systems which have operated successfully the heat source, supplied usually by a gas flame or steam, has been about 300° F. Although such systems operate efficiently and with adequate capacity, none has achieved commercial importance. In contrast, solar heat from flat plate collectors rarely exceeds 190° F. and the heat collection efficiency of the collectors is much higher at lower temperatures of 120° to 140° F. Due to lower ranges of temperatures involved and, in particular, the reduced heat available from solar energy as a heat source, concentrated research and development efforts in the last few years, funded both by the Government and private industry, have failed to produce a cooling system which holds commercial promise. For example, modification of a Lithium Bromide system for solar energy has resulted in a drastically reduced and low efficiency, requiring 80° F. water cooled condensers. When the condenser temperatures raises to 120° F., as is necessary for air cooled condensers, a driving temperature at 140° to 160° F., which is reasonably obtainable from flat plate solar collectors, is insufficient for the system to operate.

It is considered that a primary difficulty with applying solar energy to conventional sorption systems is that the physical processes involved are either solution or surface sorption and are exponentially thermally activated in accordance with the simple Arhenius's equation. As a result, the pressure differentials produced by the small temperature differentials are impracticably small and thus useless in most applications.

For specific prior patents which disclose the state-of-the-art, attention is invited to the following:

| | | |
|---|---|---|
| 2,221,971 | Haywood | Nov. 19, 1940 |
| 2,293,556 | Newton | Aug. 18, 1942 |
| 3,043,112 | Head | Jul. 10, 1962 |
| 3,242,679 | Puckett et al | Mar. 29, 1966 |
| 3,270,512 | Webb | Sept. 6, 1966 |
| 3,621,665 | Mokadam | Nov. 23, 1977 |
| 4,007,776 | Alkasah | Feb. 15, 1977 |
| 4,011,731 | Meckler | Mar. 15, 1977 |
| 4,023,375 | Chinnappa et al | May 17, 1977 |
| 4,028,375 | Anderson | Jun. 14, 1977 |
| 4,030,312 | Wallin et al | Jun. 21, 1977 |
| 4,044,819 | Cottingham | Aug. 30, 1977 |
| 4,070,870 | Bahel et al | Jan. 21, 1978 |
| 4,081,024 | Rush et al | Mar. 28, 1978 |

SUMMARY OF THE INVENTION

An object of the instant invention is to employ solar energy, or other types of energy which have low power densities and, therefore, produce relatively small heating effects, by the utilization of molecular sieve zeolites as a solid adsorption material to produce reasonably large pressure differentials at small temperature differences. This is accomplished due to the extremely strong temperature dependence (theoretically exponential up to the fifth power of the temperature) of gas sorption and desorption on certain materials such as exist in the molecular sieve zeolite family. The large pressure differential is used in the construction of a solar energy cooling system utilizing such materials. Different approaches are disclosed; in one a constant temperature is utilized across the molecular sieve zeolite, and in another a temperature gradient is developed across a zeolite barrier. The unique characteristics of zeolites permit the design of such systems, especially to satisfy the needs for home cooling and air-conditioning. The output of such system increases as the solar load increases and therefore, the higher needs for cooling automatically are met by the higher output of such systems. Although the primary objective of this invention is to provide an alternative approach to solar energy cooling and air-conditioning of buildings, the system may also be utilized for the development of large-scale systems capable of operating from waste heat power plants and from other thermal polluters thereby reducing the pollution and converting it to useful energy.

Molecular sieve zeolites are a class of synthetic or natural mineral materials which have unique, non-linear adsorption properties described by exponentials to the second, third and fourth power in temperature and pressure. Zeolites have been found uniquely capable of converting temperature differences into very large pressure differentials which can be practically utilized for cooling cycles or converted to mechanical energy. Zeolites also lend themselves to unique designs which utilize solid materials and diffusion through them to produce a solar refrigeration system of high conversion efficiency without moving parts which is, therefore, capable of long life and reliability.

Due to the extremely strong temperature dependence, a change in temperature from 25° to 100° centigrade (77°-212° F.) can desorb better than 99.9% of the gas at constant pressure. Alternatively, at a constant volume, the same change in temperature causes an increase of pressure as high as four orders of magnitude.

Several approaches to the use of solar energy with a zeolite system are disclosed herein, the first being to construct panels made of adsorbent material and to saturate them at ambient temperatures with the working gas. When the panels are heated by solar heat, they desorb the gas, the pressure increases and the subsequent gas expansion produces the desired cooling effect. The gas is then collected in a separate container which preferably is also provided with a sorbing material and during night when the roof panels cool by radiation, they may be recharged to saturation again by the working gas and ready for a new cycle during the following day.

The sorption capacity of commercial zeolites is on the order of about 20 to 40 pounds of gas for each 100 pounds of such material. Using existing values of activation energies of between 4 and 10 kilocalories per mole, the theoretical cooling capacities for each 100 pounds of sorbent material are between 10,000 and 20,000 BTU's. Thus, it will be appreciated that the existing roof area of a typical house is sufficient for a reasonably efficient cooling system.

In a second approach, the roof panels may be made by pressing and sintering the molecular sieve zeolites materials into the proper shape and sealing them in a container capable of withstanding pressure. Two types of containers are disclosed herein: one with a glass cover in which the solar energy is absorbed directly by the molecular sieve zeolite panel which has preferably been darkened on one surface with, for example, carbon black to increase the absorption of solar energy; the other container is constructed completely of a darkened metal and absorbed energy is conducted to the adsorbent material on the interior by a structure similar to the familiar honeycomb structure which surrounds the molecular sieve on all sides. Although this latter structure uses indirect heating of the molecular sieve material, it is capable of higher working pressures and, therefore, of higher operating efficiency.

Zeolites at room temperature adsorb large quantities (up to 40% by weight) of any polar gas, that is gas with dipolar or quadrupolar moment, such as $H_2O$, $NH_3$, $H_2S$, $N_2$, $CO_2$, etc. as well as both fluro-, chloro- and hydrocarbons. Due to the high non-linearity of their adsorption properties, zeolites desorb large quantities of such polar gases when heated to temperatures which are easily achieved by flat plate solar collectors. For example, a pressure differential of 50 to 1 to 1000 to 1 can be obtained when a container full of zeolite with adsorbed gas is heated from room temperature to less than 200° F.

In a third approach, ice is produced within a closed system by coupling a zeolite panel to a container (evaporator) of preferably, salt brine by an air-cooled condenser. Water vapor at a low absolute pressure (0.05 psia) boils at about 20 F. to be adsorbed by the zeolite which, when heated by solar energy, increases the pressure within the system to 0.5 psia or higher and desorbs the water vapor which condenses and returns by gravity to the container. The evaporation of the water cools the brine to a slush and about seven pounds of ice are manufactured for each pound of evaporated water. In practice, about one square foot of zeolite collector produces about two pounds of ice.

Water vapor which was equiliberated at room temperature and had a partial pressure of 0.05 psia would have a pressure of 1.5 psia at 120° F. Further, this temperature was sufficient to cause some water vapor to be desorbed from the zeolite and also condensed in a condenser held at 120° F. By increasing the zeolite temperature to 140°-200° F. range, up to 10% by weight of the water vapor (relative to weight of zeolite) can be desorbed from the zeolite.

A fourth system which is disclosed involving a plurality of pressure containers filled with zeolite through which a closed liquid circuit flows in heat exchange conduits, the liquid being heated by solar panels and heating the zeolite in one container while another container is cooled. A gas, such as nitrogen, is expelled from the heated zeolite to the cooler zeolite through a reciprocating engine or turbine. By changing the valving, the previously heated container can be cooled and vice versa for the cooled container to continue the process.

With zeolite equiliberated at room temperature with nitrogen gas at one atmosphere, that is, 15 psia, when the zeolite is heated to 160° F., then the nitrogen gas is desorbed and the pressure in the container increases to 15,000 psia and large quantities of nitrogen gas can be desorbed at such pressures. Similar tests were made with $NH_3$ and $CO_2$ gases, water vapor, and a number of fluoro- and chloro-carbons. In all cases, the pressure in the container increases 50 to 1000 times when the zeolite is heated from room temperature to 200° F. and on the average, 10% by weight of the gas is desorbed at the high pressure. Of course, lesser pressures may be used for safety and other practical engineering reasons.

In contrast, other solid adsorbents such as silica gel, activated alumina and activated carbon adsorb much smaller quantities of such gases under the same conditions and desorb even less when heated to the 160° to 200° F. range. Thus, the resulting pressures are much smaller and the quantities of gas desorbed at high pressures are negligibly small. It has been found that liquid-gas systems suffer from the same shortcomings and do not operate efficiently, if they operate at all, at such low temperatures and high pressures. This is confirmed when driven by 140° to 160° F. with an air cooled condenser of 100° to 120° F.

In theory the amount of adsorbed gas in a molecular sieve zeolite is represented by the equation $$a = a_{o2}\theta_2 + a_{on}\theta_n$$

where $a_o$ is the limiting adsorption value of the gas and $\theta = \exp-[(RT\ln(p_s/p)E_n]$ and n is an integer between 2 and 5. R is the universal gas constant; $P_s$ is the limiting saturation pressure; p is the actual pressure; and $E_n$ is the activation energy, which is on the order of a few kilocarlories per mole. In this connection, reference is made to M. Dubin and V. Astakhov, "Description of Adsorption Equilibria of Vapors on Zeolites Over Wide Ranges of Temperature and Pressure," *Second International Conference on Molecular Sieve Zeolites*, Sept. 8-11, 1970, Worcester Polytechnic Institute, Worcester, Mass., pp. 155-166.

In view of the foregoing, it will be understood that the dependence of gas adsorption on temperature in molecular sieve zeolite is at least exponential with a square of temperature and may, in theory, go as high as to be exponential to the fifth power of the temperature. (For example, acetylene on zeolite NaA).

The primary object of this invention is the provision of a system for the utilization of low grade heat such as solar heat or the waste heat of a power generating plant and the like by employment of the large variation of sorption capacity of molecular sieve zeolites, whereby with variations in temperature the system converts small variations in absolute temperature to large variations in gas pressure for heating, cooling, refrigeration or other energy uses.

A further object of the invention is to provide the above system to produce a cyclic heating of a sorbent material causing the gas to flow from a hot sorbent under relative high pressure to a cold sorbent thus generating the desired energy.

Another object is to create a temperature gradient across the sorbent material which produces a pressure differential with the gas flowing from the hot to the cold side of the sorbent material via an external arrangement wherein energy is used and from the cold to the hot side through the material thus creating a continuous gas flow at a pressure differential, and accordingly, continues use of the energy resulting from the pumping effect across the adsorbent material which is relatively heated on one side only.

A yet further object is the utilization of solar panels containing molecular sieve zeolite within a closed low pressure valveless system wherein ice or brine slush is produced in an enclosure during a twenty-four hour cycle, the refrigerant vapor being desorbed during the day and adsorbed in the night.

A still further object is to provide continuous work by heating and cooling a plurality of zeolite in containers in series whereby a continuous gas pressure differential is obtained by valving, the pressurized gas causing a turbine or the like to operate.

Further objects, adaptabilities and capabilities will appear as the description progresses, reference being had to the accompanying drawings, in which:

DESCRIPTION OF THE PREFERRED EMBODIMENTS

Figures 1, 2, 3:
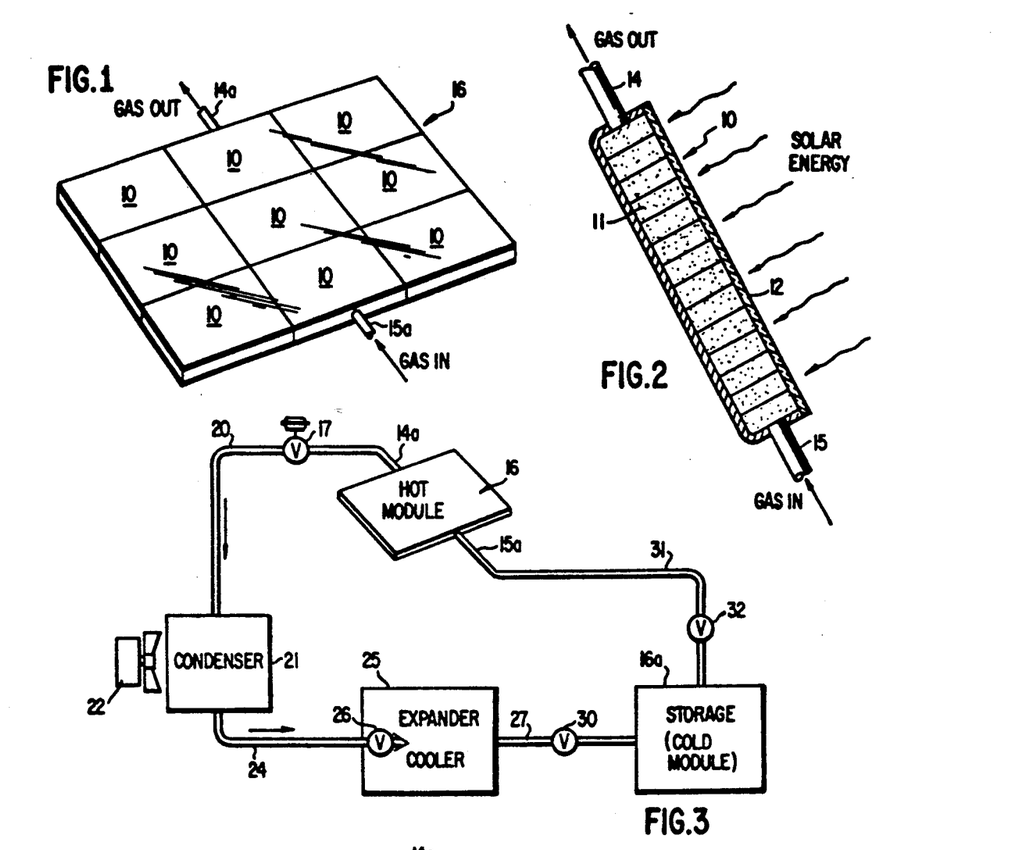
FIG. 1 is a perspective view illustrating a group of panels in accordance with the invention.
FIG. 2 is a cross-section of one of the panels shown in FIG. 1.
FIG. 3 is a systemic diagram showing the day operation or hot side of the gaseous circuits.

Referring now to FIGS. 1-4, twelve containers 10, each composed of metal or other heat conductive material having preferably a honeycomb structure filled with zeolite 11, make up a solar energy collecter comprising a module 16. Surface 12 of each container 10 is darkened so that it absorbs as much solar energy as practicable. It will be noted in FIG. 2 that each container 10 is provided with a gas outlet 14 and a gas inlet 15. It is to be understood that the cross-sectional view disclosed in FIG. 2 is representative of a number of panels such as indicated in FIG. 1 which can be installed on the roof of a house or any other surface illuminated by the sun. The individual panels 10 are combined into a module 16 into which the gas outlets 14 are connected together to form an outlet 14a for the module 16 and in a like manner the gas inlets 15 are connected together to form gas inlet 15a for the module 16. Although only one module 16 is shown, those skilled in the art will understand that a plurality of modules 16 may be provided. Each module 16 connects with a one-way valve 17, the valve 17 being pressure controlled to open when the pressure in module 16 increases to a selected amount. Outlets 14a for a bank of modules 16, through an appropriate manifold, lead from valve 17 into a first conduit or line 20 which connects to the intake of a condenser 21 which is cooled by a fan 22. From the outlet of condenser 21, a second conduit or line 24 connects to the inlet of a gas expander cooler member 25 which includes an expansion valve 26. It will be understood by those skilled in the art that the cooler member 25 can be connected into the building's air conditioning to provide cooling therefor. From cooler member 25, a third line or conduit 27 serves to convey fluid through a one-way valve 30 into a confined space which can be a cold module 16 designated 16a in FIG. 3. Alternatively, storage container 16a may be an empty gas container which is also, if desired, filled with a zeolite material in order to minimize the volume which would otherwise be necessary.

When modules 16 are heated, gas in the zeolite material 11 is desorbed and pressure builds up in each container 10. When an upper threshold as set by the one-way pressure controlled valve 17, is exceeded, valve 17 opens and gas flows via outlet 14a in the first line 20 to condenser 21 which may be cooled by fan 22 as shown or water cooled. The working gas is cooled in condenser 21 where it may be converted into a liquid fluid and then conveyed via the second line 24 to cooler member 25. Here the gas expands (or the liquid fluid evaporates into a gas) while at the same time effecting the cooling of member 25. As indicated above, this cooling effect is preferably utilized at this point in a conventional way for air-conditioning or refrigeration or the like. The gas then passes through the third line 27 and one-way valve 30 into the storage module 16a. As previously indicated, module 16a can be identical to module 16 except that at a particular time it is not exposed to the direct rays of the sun.

Figure 4:
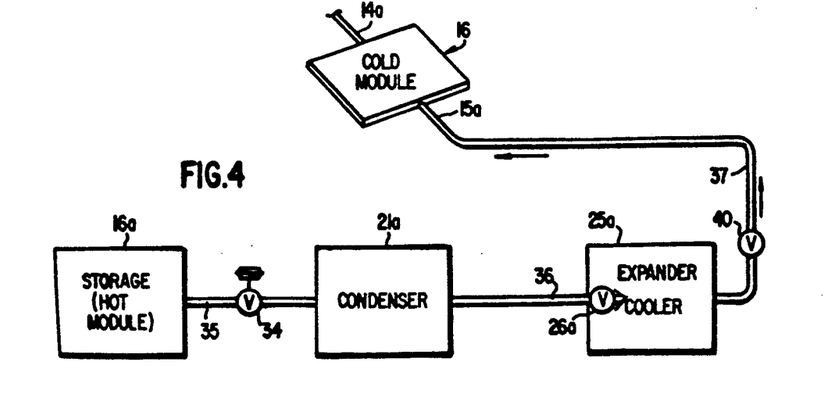
FIG. 4 is a systemic diagrammatic representation of the night operation or cold side of the system.

It will be understood that as long as the zeolite in the module 16 is warmer than the gas or zeolite in module 16a the flow of gas is from module 16 via condenser 21 and cooler member 25 into module 16a. The next cycle of the operation takes place when module 16 is no longer being heated such as, for example, where it is on the shady side of the building, or shaded by some other means, or the sun has set for the night. In such event, module 16 is thereafter cooled by radiation and develops a low pressure in the interior of each container 10. There are then several variations of what may occur. For example, in a desert climate when the days are hot and the nights are cool, module 16a may be buried or otherwise insulated and as indicated in FIG. 3, directly connected to the inlet 15a and to module 16 via a conduit or line 31 containing a one-way valve 32. However, if if the evenings are also warm, then air-conditioning during the night may be desired in which case the modified arrangement disclosed in FIG. 4 is more desirable. It will be appreciated that FIG. 4 thus shows a modified return cycle of the gas from module 16a to the module 16 which is now cooled.

In view of the foregoing, it will be understood that one-way valve 17 and 32 divide the hermetically sealed heat transfer system disclosed herein into two sealed spatial segments. The first such segment comprises the solar energy collector, module 15, outlet 14a and inlet 15a. The second segment comprises condenser 21, cooling member (evaporator) 25, module 16a, lines 20, 24, 27 and 31, and valves 26 and 30. In the evening, module 16 is a first heat exchange means for removing heat from the first segment by cooling and thus transferring its heat to the atmosphere. This includes, of course, the heat generated by adsorption of the refrigerant in module 16 from module 16a. During the daytime, condenser 21 is a second heat exchanger for transferring heat from the second spatial segment to the atmosphere.

Module 16a, as illustrated in FIG. 4, connects through a fourth line or conduit 35 which contains a one-way pressure regulated valve 34 similar to valve 17 which is set to permit the passage of gas from the storage space 16a at a predetermined pressure differential. Conduit 35 connects into a condenser 21a which may be the same or a different condenser than condenser 21. The outlet from condenser 21a constitutes a fifth line or conduit 36 which leads into the expansion valve 26a of a cooler member 25a which, again, can be the same as cooler member 25 in which case one-way valve 30 should be provided with a second outlet leading back to the module 16 controlled by the relative pressure between module 16 and that in module 16a, as would occur to one skilled in the art. In this connection it will be noted that a sixth line or conduit 37 connects the outlet of the cooler member 25a and inlet 15a of module 16. In line 37 a one-way valve 40 is provided. An indicated, valve 40 and valve 30 can be incorporated in a single valve preferably controlled in the event condenser 21a and coolant member 25a are the same as condenser 21 and coolant member 25, respectively. The condenser 21a may, as condenser 21, be cooled by a fan, cooling water, or other appropriate means. The immediate locality of the fan is, of course, warmed by heat transfer caused by the airstream therefrom discharged from condensers 21 and 21a.

In the cycle wherein module 16 is cool and the gaseous fluid therein is at a less pressure than that in module 16a, an appropriate differential builds up, valve 34 opens and the gaseous fluid flows into the condenser 21a wherein it is cooled. Then the working fluid as a gas or liquid flows into cooler member 25a wherein it is expanded by means of expansion valve 26a and cools in such a manner that it can be utilized for the air-conditioning or cooling system of a building or for refrigerations or for the like. Finally, module 16 is recharged again with the working gas for the next cycle.

From the foregoing, it should be understood that the modules 16 and 16a and their immediate environments function for the storage and transfer of heat, and therefore as heat sinks, in the thermal systems disclosed.

It will be understood that the cycles can take place, one during the day and the other during the evening, or, where the modules are placed on different sides of the building then one cycle may take place during the morning and the next cycle during the afternoon and evening. In the latter event, the cycle can be arranged so that the gas flows from hot modules 16 on the eastern aspect of a building or roof to cool modules 16 on the western aspect of the building or roof, then when the latter cooled modules become heated, the flow may be to a storage space, and finally during the evening or night back to the first modules which are on the eastern aspect of the roof of the building.

Alternatively, the heat for module 16 may be supplied via a heat exchanger from the waste heat of a power plant, incinerator or other source of heat pollution rather than from solar heating. It will also be understood by those skilled in the art that the energy of the expanding gas is also capable of utilization for conversion into mechanical or electrical energy by conventional means utilizing reciprocal engines or turbines and electric generators. In such a case, the invention of the cyclic heating and cooling of module 16 and module 16a is obtainable by proper valving of the waste heat from the source to the heat exchangers for the zeolite material. More specific embodiments also showing an indirect heat exchange system for the zeolite are disclosed and described subsequently with reference to FIGS. 12 and 13.

It will be appreciated by those skilled in the art that whenever module 16 is heated and thereupon expels its refrigerant and is then cooled, it is activated and thus primed to adsorb refrigerant. Such being the case, whenever the vapor pressure in module 16, following such activation, reduces to below that in the components upstream thereof, so that valve 32 or valves 40 and 34 are caused to open and, the vapor pressure in such components being reduced by the adsorption of vapor therefrom into module 16, flash evaporation of some of the refrigerant which is in liquid form in such components occurs adiabatically in response to the reduced vapor pressure.

The approach described above and shown in FIGS. 1-4 takes advantage of the cyclic character of solar energy during the day-night periods to achieve a pumping effect without the use of compressors or other moving parts. It thus has a potential for a long maintenance free life. However, it either has to be designed for the largest possible integrated sun load during a complete day and therefore is operating below its maximum capacity most of the time or it should be augmented by alternative cooling methods during days of maximum heat.

A second approach to the problem of maximum capacity which results in a reduction in both the size and cost of the complete system will now be described. This approach is based on the circumstance that when a thermal gradient is applied across a piece of adsorbing material, the consequence is essentially a pumping action. Although this has been known for materials having a diffusion coefficient which is thermally activated, the situation is substantially different in the family of molecular sieve materials.

Molecular sieve zeolites have a crystal structure of intracrystalline pores in the form of large cavities (in the molecular sense) linked by large or small shared windows. For this reason the motion of a gas molecule consists of a thermally activated "sticking" to the inside of the cavities and a second energy barrier for diffusion through the windows between cavities. This second process is responsible for the sifting action of the molecular sieves whereby gases with molecular dimensions less than the window size pass through the sieve whereas gases with molecular sizes larger than the windows do not pass. In addition, molecules with large electric dipole (or quadrupole) moment usually "stick" to the cavities (water for example) in contrast to atoms and molecules without such moment—for example the noble gases—which do not stick to the cavities and their motion is controlled only by their relative size vis-a-vis the size of the windows. For these reasons, motion of gases through molecular sieves resembles diffusion only slightly and is considerably more complex.

In trials with a zeolite, Linde type 4A, panels were sintered with a Kaolin binder. With one side of such panels being heated to about 100° centigrade, a pumping action was observed with a variety of different working gases. Such gases included $CO_2$, Freon-11 ($CCl_3F$), Freon-12 ($CCL_2F_2$), Freon-21 ($CHCl_2F$), Freon-22 ($CHClF_2$), water vapor, $NH_3$, $SO_2$, $N_2$ and $O_2$.

In the embodiment of the invention being discussed, the glass covered container 41 is used and the panel 44 is utilized as a divider to separate the container into separated pressure vessels. This compares with the first approach wherein the zeolite did not form a pressure barrier and thus the inlet and outlet portions of each container 10 were, in effect, at all times at approximately the same pressure.

Figures 5, 6, 7:
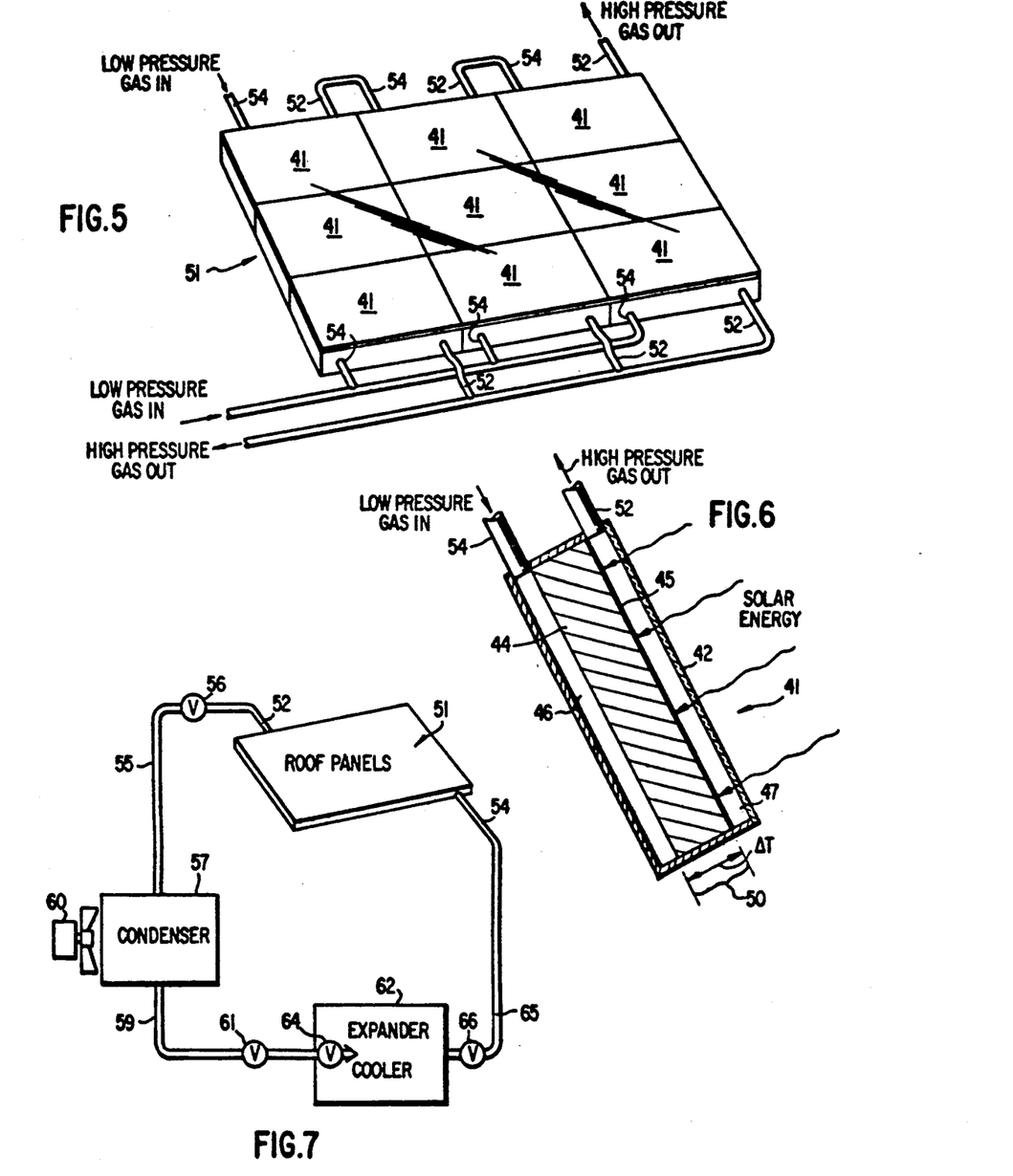
FIG. 5 shows a group of panels of a further embodiment of the invention.
FIG. 6 is a cross-section of one of the panels shown in FIG. 5.
FIG. 7 is a systemic diagrammatic representation of a circuit which uses roof panels in accordance with the latter embodiment.

Referring now to FIGS. 5-7, it is to be noted that metal container 41 which has a transparent cover 42 contains a sintered zeolite divider 44. The side 45 of zeolite divider 44 facing the sun is darkened by an appropriate means, for example with carbon black. Container 41 is thus divided into two parts by divider 44, a rear part 46 containing the gas at a low pressure and temperature and a forward casing part 47 which contains the high pressure, high temperature working gas. When heat generated from the sun or other source heats side 45 of zeolite divider 44, it creates a temperature gradient $\Delta T$ which is designated by reference numeral 50 in FIG. 6. The inner molecular pumping action of the zeolite barrier 44 described above creates a pressure differential between the rear part 46 of container 41 and the forward casing part 47. This pressure differential is then used to provide the desired energy expenditure of the system.

In a module 51 shown in FIG. 5, the individual panels 41 each have their outlets 52 and inlets 54 connected in series as illustrated in the upper part of FIG. 5 in order to obtain higher pressure, or the connection may be in parallel as indicated in the lower portion of FIG. 5, for a greater flow rate, or a combination thereof may be employed.

As shown in FIG. 7, module 51 has its outlet 52 connected to a first conduit 55 via a one-way valve 56 which leads into a condenser unit 57 which can be cooled by fan 60 or other appropriate cooling means. The outlet of condenser 57 carries the working gas through a conduit 59 into a cooler member 62 via a one-way valve 61. In cooler member 62, gas is expanded by means of an expansion valve 64 whereby it becomes very cool and may be utilized for air-conditioning, refrigeration or the like. The resulting fluid is then collected and returned via a return conduit 65 to the low pressure gas inlet 54 of the module 51 via a one-way valve 66 which is contained in the conduit 65.

Thus, as may be seen in the above-described apparatus FIGS. 5-7, the working gas from the high pressure casing part 47 is conveyed from the high pressure outlet 52 through a one-way valve 56 and conduit 55 to the condenser unit 57 where the gas is cooled by air from fan 60 or cooling water or other suitable means. The gas now cooled (which may be in a liquid form) is conveyed from condensor 57 into cooler member 62 where it produces cooling or refrigeration by expansion via the expansion valve 64. The resulting low pressure gas is then conveyed through the conduit 65 via the one-way valve 66 back to the low pressure part 46 of container 41 through the low pressure gas inlet 54.

In absolute pressure units, the following pressure differentials have been found operable with the gases: Freon-11, 3/18 psia; Freon-12, 26/107 psia; Freon-21, 5/51 psia; Freon-22, 43/175 psia; water vapor, 0.1/1.0 psia; $SO_2$, 12/66 psia; $CO_2$, 332/1043 psia; and $NH_3$, 35/170 psia.

This last-described embodiment has the advantage of being capable of reusing the same volume of gas a number of times during a given day and having a cooling output which is directly proportional to the solar heat load. Thus, the larger the solar heat load, the greater is the cooling action which results.

Both approaches have advantage over the conventional sorption cooling systems in that they have potentially higher efficiencies because of the much stronger temperature dependence of the sorption process wherein zeolite is used as indicated. In addition, there is no need for mechanical moving parts inasmuch as the system consists only of solid panels, pressure vessels and conduits, and the working gas—thus, offering high reliability and a long operating life.

Figure 8:
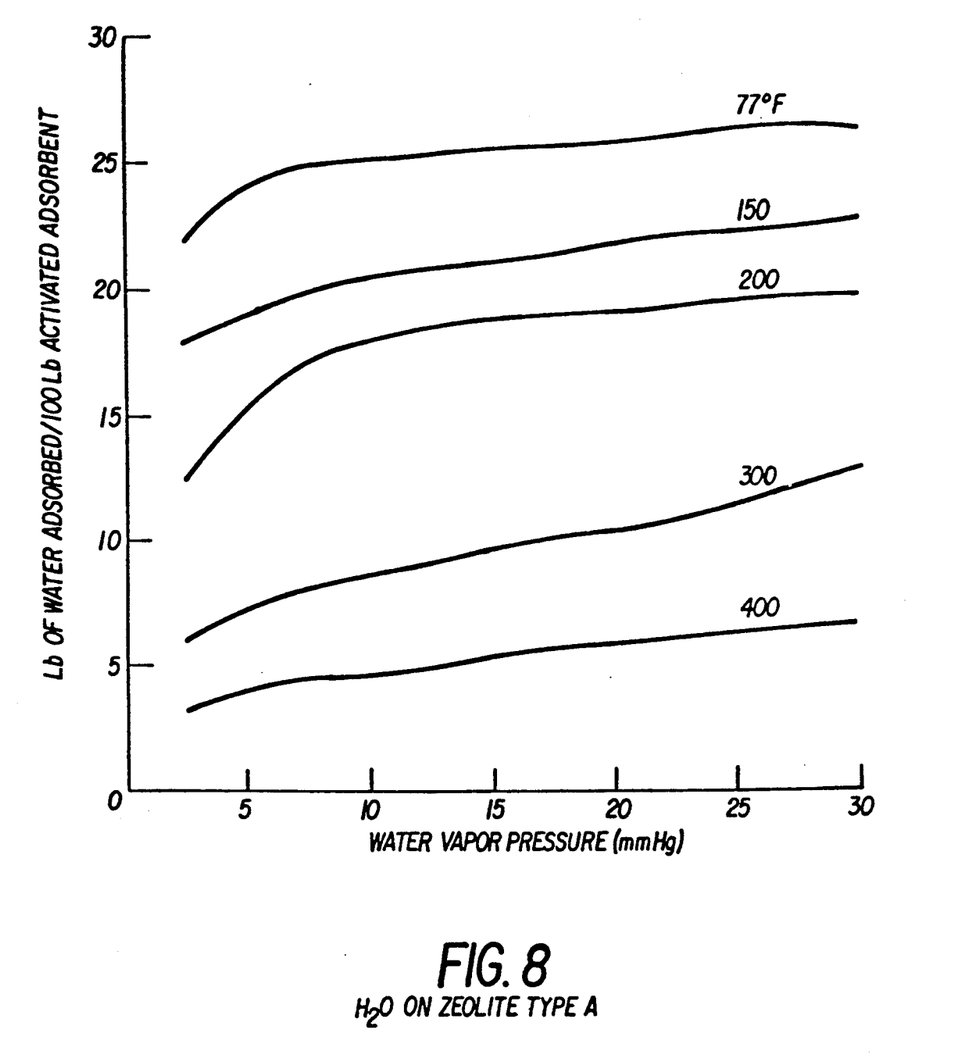
FIG. 8 is a graph showing the adsorption isotherms of water vapor on zeolite type A.
Figure 9:
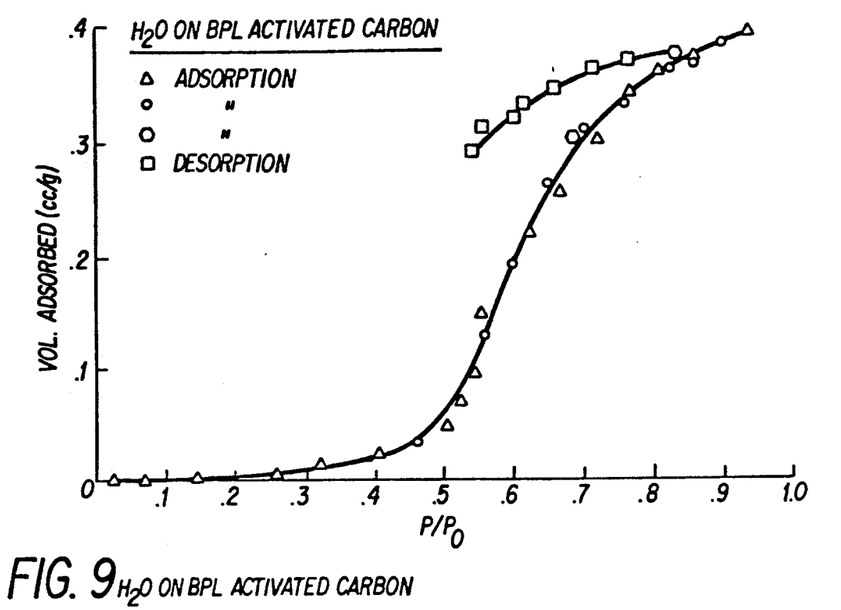
FIGS. 9 and 10 show the room temperature adsorption isotherms of water on two different types of activated carbon.
Figure 10:
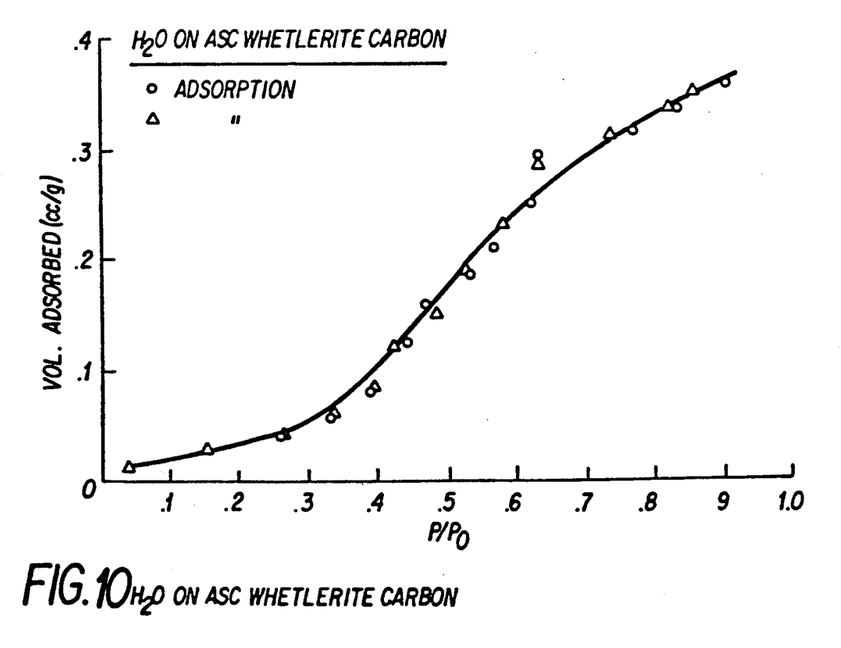

FIGS. 8, 9 and 10 are provided to indicate the mode of operation of molecular sieve zeolite wherein water vapor generally at a pressure less than one atmosphere is the working gas. The figures also illustrate the major distinction between molecular sieve zeolites and other microporous absorbents, such as activated carbon, activated alumina, or silica gel. The major advantage of molecular sieve zeolites is due to its capacity to adsorb polar molecules due to electrostatic interactions in addition to capillary condensation which is a common characteristic of all microporous adsorbent. Molecules with large dipolar moments, such as water, carbon dioxide or quadropole moments such as nitrogen or oxygen, are bound to the zeolite microframework by electrostatic interactions with the positive and negative ions of the alumina-silica network. This results in an extremely non-linear temperature and pressure dependence of the adsorption characteristics of the polar molecule gases on zeolites. FIG. 8 illustrates the adsorption isotherms of water vapor on zeolite type A. At a partial pressure of a 5 mmHg, which correspond to a boiling temperature of water of about 35° F., the zeolite at room temperature adsorbs over 20% by weight of water. On the other hand, when zeolite is heated to 200° F., it desorbs water vapor almost independently of the partial pressure until the amount absorbed is reduced to about 17% by weight.

FIGS. 9 and 10 show the room temperature absorption isotherms of water on two different types of activated carbon. The saturation pressure $P_0$ of water at this temperature is 25 mmHg. Therefore, at the 35° F. boiling temperature of water, the ratio $P/P_0$ is 5/25 or 0.2. From FIGS. 9 and 10, it is to be seen that no significant amounts of water (less than 2% by weight) are adsorbed at such low partial pressures and, therefore, a system based on activated carbon will not operate with water vapor at these pressures. Its efficiency is essentially zero. In practical systems utilizing water vapor at partial pressures, activated carbon, activated alumina and silica gel have zero or near zero efficiencies whereas zeolites demonstrate overall engineering efficiency as high as 35 or 40% with possibilities for further improvement.

Figures 11, 12:
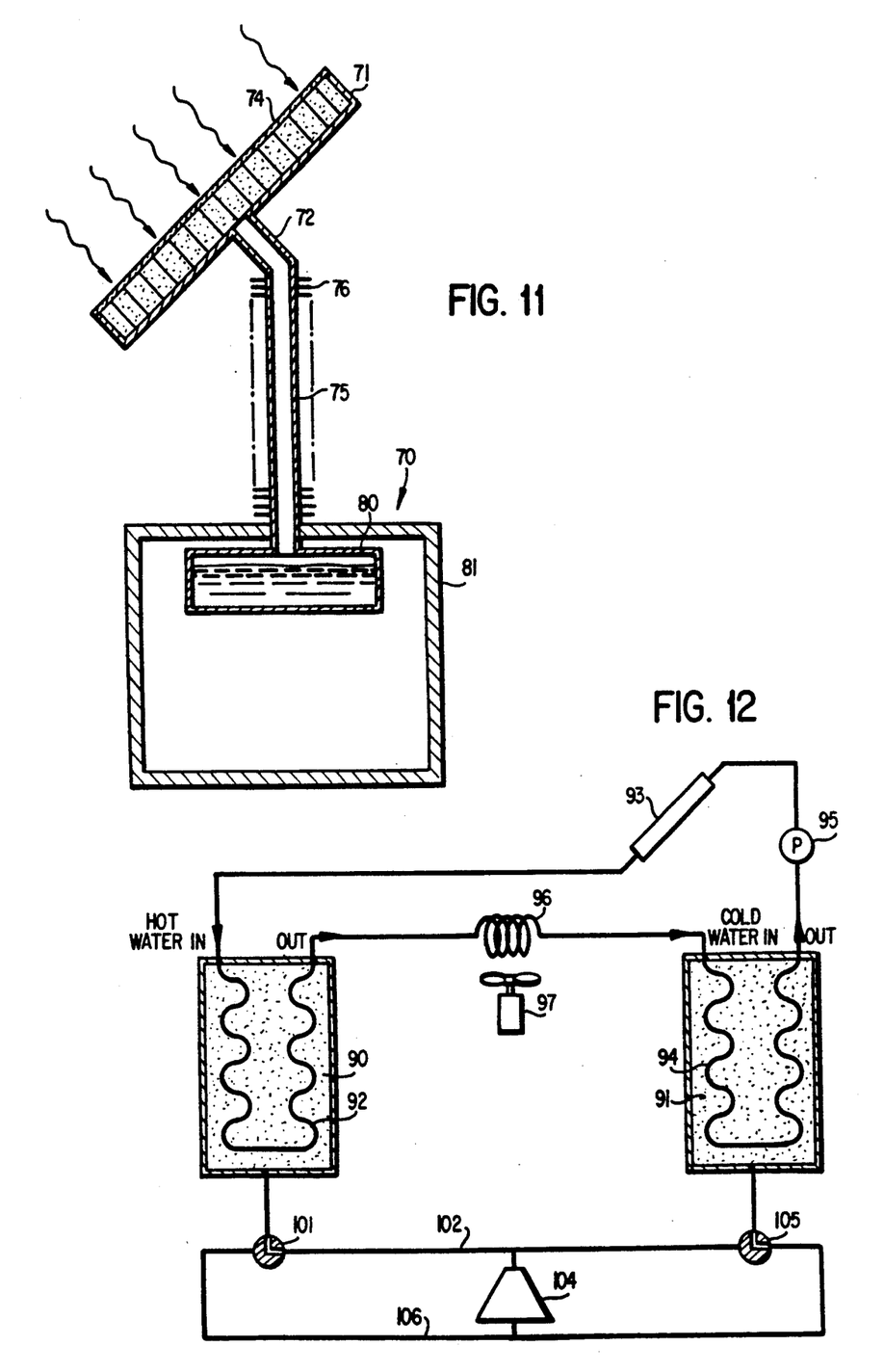
FIG. 11 illustrates a valveless zeolite solar refrigerator.
FIG. 12 is a diagrammatic representation of two containers having heat exchanges in zeolite wherein the heating and cooling is alternated to produce work.

The utilization of water vapor generally at less than atmospheric pressure is illustrated in the embodiment of FIG. 11. Such figure shows a solar refrigerator 70 which might be considered more accurately an icebox. In this connection, zeolites have been found as the only non-liquid absorbent material capable of producing ice from solar energy with an acceptable efficiency. It is thus to be understood that because of the extreme non-linearity property of zeolites, they are capable of adsorbing about 20% by weight of water vapor at pressures as low as 0.05 psi which corresponds to the boiling point of water at about 20° F. Other solids of the same type absorb less than 4% by weight under the same conditions as indicated above. Moreover, if a salt brine is utilized as a source of water vapor and the container with the brine is appropriately insulated from the outside temperature, the brine cools itself by evaporation until it freezes into a slush. Inasmuch as the heat of vaporization of water is about 1,000 BTUs per pound, whereas the heat of freezing water is only about 145 BTUs per pound, each evaporated pound of water can provide the capacity to make about seven pounds of ice. The solar icebox 70 shown in FIG. 11, utilizes this principle and it has been found that each square foot of the zeolite collector 71 will, on a summer day, produce about two pounds of ice. The solar panel 71 is essentially identical to that shown in FIG. 2 except that it has a single conduit 72 which leads both into and out of the panel which is filled with zeolite. The solar panel 71 may have a glass cover 74. Alternately, panel 71 may be fabricated from metal and painted black whereby it absorbs solar radiation. Conduit 72 merges into a tube 75 which includes a plurality of fins 76, the tube and fins provide support for the solar panel 71 and function, as will be explained hereafter, as an air cooled condenser 77. The tube 75 is received by an evaporator 80 which is filled with water, brine and ice and is enclosed in an insulated container 81 which is, in essence, the icebox, as such. This icebox 81 provides about four cubic feet of space and cold air circulates within the icebox 81 by natural convection. The evaporator 80 for this embodiment has a volume of about two gallons (sixteen pounds) of water and serves both as a source of water vapor and as a storage device for ice, the evaporator being fabricated from metal such as, for example, copper or stainless steel. As noted, it is installed in the upper half of the container 81.

The interior of solar panel 71, condenser 77 and evaporator 80 is hermetically sealed. Also, it is substantially free from gases other than water vapor. The zeolite solar panel 71 is preferably about eight square feet in area and has a thickness of about two inches containing about sixty-five pounds of zeolite.

It will be noted that icebox 70 has no moving parts or mechanical valves and requires no other source of energy other than the sun.

During the day, the zeolite panel 71 is heated by the sun. This causes the temperature of the zeolite to increase and water vapor is desorbed from the zeolite. As a result, the pressure in the sealed interior space of icebox 70 increases. When the pressure reaches the dew point at a predetermined condenser temperature such as, for example, 0.5 psia at 80° F. or 1 psia at 102° F. condenser temperature, the water vapor begins to condense rejecting the heat of condensation through the fins 76 to the ambient outside atmosphere. The resulting condensation (liquid water) runs down by gravity to the evaporator 80 where it accumulates during the day while at the same time, the ice in the evaporator 80 slowly melts. During the night, the zeolite panel 71 cools and again becomes capable of adsorbing water vapor at much lower partial pressures. As water vapor is adsorbed into the zeolites, the pressure of the system drops and at 0.07 psia, the water in the evaporator begins to evaporate at a temperature of 27° F. This cools and freezes the remaining water in the evaporator 80. About 2.2 pounds of water are desorbed and re-adsorbed in a typical twenty-four hour cycle by the zeolite panel 71. When condensed, the water rejects about 2220 BTUs to the air and produces about sixteen pounds of ice when it evaporates at night. Evaporator 80, thus, has a volume of slightly in excess of two gallons so it can store the sixteen pounds of ice and the 2.2 pounds of water desorbed during the day. In this manner, it will be appreciated that the interior of the container 81 is maintained at a constant temperature determined by the melting point of the brine within the evaporator 80. During the day, the ice in evaporator 80 slowly melts and then is re-frozen during the night portion of the cycle.

The size of icebox 70 may be increased or reduced as desired by changing the size of the zeolite panels 71. For example, an eight cubic feet capacity icebox requires about sixteen square feet of zeolite collector whereas a two cubic foot icebox operates satisfactorily with only four square feet of zeolite panel. Those skilled in the art will appreciate that other heating means such as waste heat from a combustion process may be used to heat the zeolite without changing the essential operation of the system.

The system described above with reference to the icebox 70 is illustrative of the advantage of zeolite as an adsorbent. Other solid adsorbents such as silica gel or activated carbon under the same circumstances adsorb less than 4% by weight of water vapor under the same conditions and desorb a much lesser amount.

Figure 13:
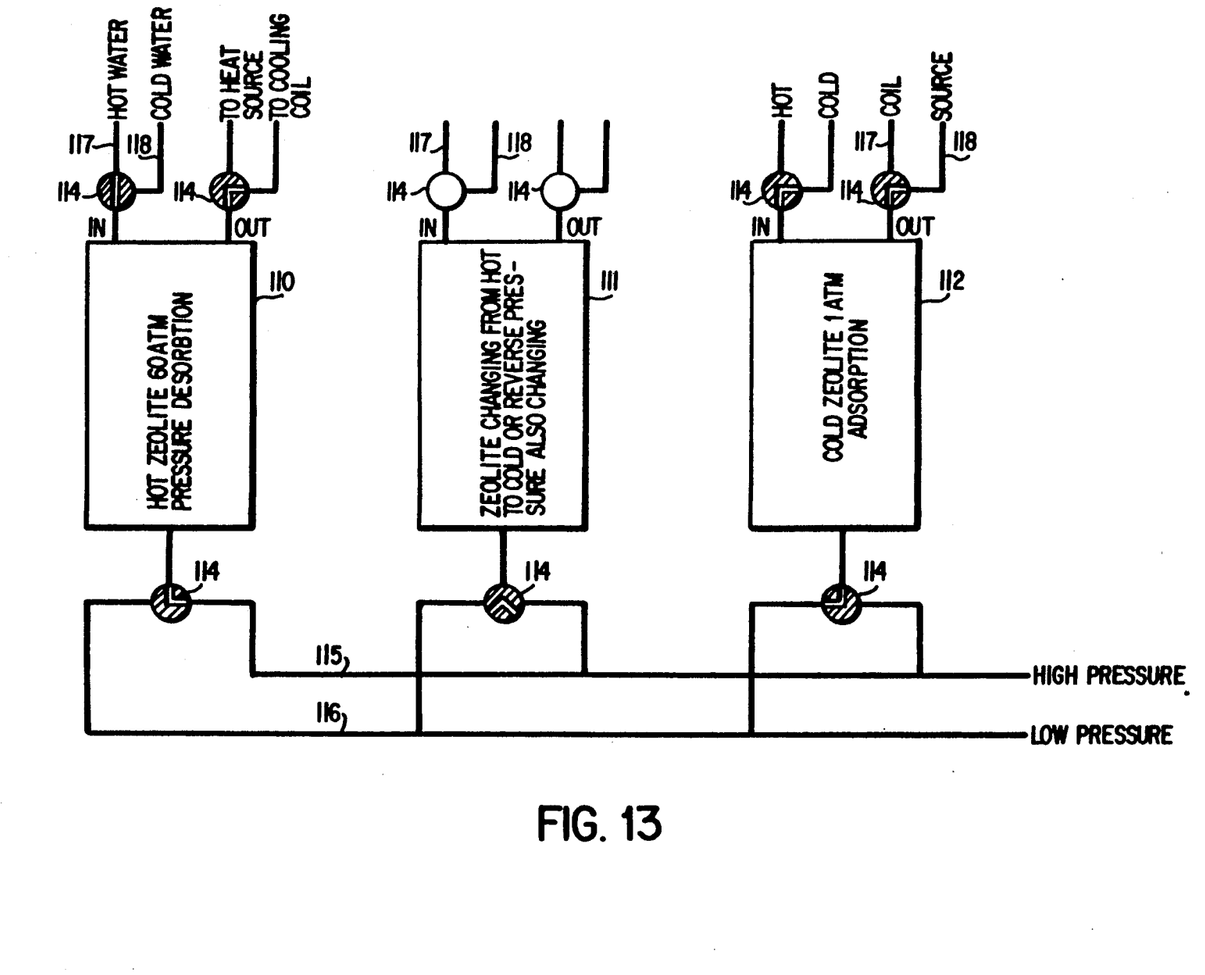
FIG. 13 illustrates an arrangement similar to the embodiment in FIG. 12 wherein three containers are used.

FIGS. 12 and 13 illustrate the use of zeolite solar panels with a high pressure gas such as nitrogen to convert low temperature differences to mechanical work.

In FIG. 12, there are two high pressure containers 90 and 91 which are capable of operating at pressures at least 2,000 pounds per square inch. One or more heat exchangers 92 and 94 are mounted within the containers 90 and 91, respectively. In this embodiment, water is used as the heat exchange liquid in a circuit which includes a bank of conventional solar collectors 93, a reversible water pump 95 and an air cooled coil 96 which is cooled by means of a motor driven fan 97. Thus, it will be noted that the liquid portion of the heat exchange system comprises the heating of the water in the bank of the solar collectors 93, an appropriate conduit leading to the heat exchanger 92 which connects with a further conduit whereby the liquid is passed through the air cooled coil 96 and into the heat exchanger 94 from whence it returns through a further conduit to the reversible pump 95 and through a still further conduit back to the bank of solar collectors 93 in the direction of arrow 100. In the event that pump 95 is reversed, the liquid circuit is also reversed.

Within the high pressure containers 90 and 91, zeolite is packed in a manner whereby there is an adequate heat transference between the zeolite and the heat exchangers.

With the circulation of the liquid in a direction as indicated by the arrows 100, the zeolite within container 90 is heated with hot water passing through the heat exchanger 92 whereas the liquid is cooled in passing through the coil 96, being exposed to cooling air currents from fan 97, and the zeolite within container 91 is thereby cooled. The heated zeolite in container 90 desorbs nitrogen gas and, at the same time, the pressure in such container increases from about one atmosphere to about sixty atmospheres. In the cool container 91, the nitrogen is at a pressure of about one atmosphere. With such pressure differentials, temperature variations are from about 20° C. to about 100° C.

The high pressure container 90 is connected through a three-way valve 101 to the high pressure manifold 102 which leads to a turbine 104. It will be appreciated that a reciprocating engine can be substituted for the turbine 104. The low pressure side of turbine 104 is connected through a further three-way valve to the low temperature, low pressure zeolite in container 91. Thus, nitrogen exhausted from the turbine 104 is readily absorbed within the zeolite in container 91.

When the nitrogen gas from container 90 has been desorbed and passed through the turbine 104 to be absorbed in the zeolite within the container 91, the cycle of the zeolite absorption, desorption is complete and the reversible pump 95 is reversed together with the two three-way valves 101 and 105 whereby the zeolite in container 91 is heated and desorbed, again through the high pressure manifold 102, turbine 104 and the low pressure manifold 106 to be absorbed in the now cooled zeolite in container 90.

Those skilled in the art will appreciate that due to the cyclic nature of the systems shown in FIG. 12, there will be a small period of time when the zeolite system, as such, is non-operational because the zeolites are not hot or cold enough to perform their requisite desorption and absorption functions. This can be alleviated by placing accumulators of sufficient size in the high pressure manifold or additional volume as may be otherwise available to operate turbine 104 or by providing flywheels having a sufficient energy storage capacity which are driven by turbine 104 or by other like means.

Another means for providing continuous operation is disclosed in FIG. 13 where three zeolite filled containers 110, 111 and 112 are provided, such containers having heat exchangers as disclosed in reference to containers 90 and 91. In this embodiment, two of the zeolite filled containers are used for driving the turbine 104 while the third zeolite filled container is either being heated or cooled depending upon the requirements of the system. Although this system may operate without interruption, it requires a much larger number of three-way valves which are designated 114 for switching the high pressure manifold 115 and low pressure manifold 116 for the high and low nitrogen gas, respectively, and to hot water or cool water sources 117 and 118, respectively. A control system for the proper valving may be a small computer of digital or analog types such as, for example, are well-known for controlling the cycles of commercial washing machines.

As with other embodiments, it is to be appreciated the embodiment disclosed in FIG. 13 may be utilized to transform energy to different types, as well as forms such as heat-to-mechanical, of energy. For example, high pressure fluid from manifold 115 may be used as the high pressure fluid in a cooling system which is, after expansion and evaporation, collected through manifold 116. In such a system utilizing nitrogen gas, cooling to cryogenic temperatures, may be achieved. With water vapor as the working fluid, air conditioning is obtainable from, for example, hot water heat normally discharged from the radiator of water-cooled internal combustion engine installed in a vehicle.

Although I have described the preferred embodiments of my invention, it is to be understood that it is capable of other adaptations and modifications within the scope of the appended claims.

Having thus described my invention, what I claim as new and desire to secure by Letters Patent of the United States is:

1. An apparatus using solar radiation as the primary energy source, said apparatus defining a hermetically sealed heat transfer system comprising:
   a solar energy collector;
   a first sealed spatial segment for adsorbing and desorbing a refrigerant, said first sealed spatial segment being in thermal communication with said collector and containing an adsorbent material comprising a molecular sieve and an adsorbed, condensible refrigerant;
   a second sealed spatial segment for condensing and evaporating refrigerant vapor;
   a valve, opposite sides of which are in communication with said spatial segments;
   first heat exchange means for removing heat from said first spatial segment; and
   second heat exchange means for exchanging heat between said second spatial segment and fluid exterior thereto, said apparatus being operable to effect an intermittent solar powered heat pump cycle of transferring heat relative to a heat sink during both the adsorption of said refrigerant into and from said adsorbent material.

2. The apparatus of claim 1, wherein the refrigerant is water.

3. The apparatus of claim 1, wherein the fluid is air.

4. A process for cooling a thermal sink using solar radiation as the primary energy source, said process comprising the steps of:
A. providing a solar collector;
B. providing a pressure tight enclosure defining a first space and a second space including conduit means connecting said spaces, said conduit means containing valve means, said enclosure containing a working refrigerant, said first space being in thermal communication with said collector and containing an adsorbent material comprising a molecular scene capable of adsorbing said refrigerant exothermically;
C. raising the vapor pressure in said first space and desorbing the refrigerant from the adsorbent material using solar energy;
D. allowing the desorbed refrigerant to flow from said first space into said second space through said valve means and condensing the vapor of said refrigerant therein by transferring the refrigerant's heat of condensation into the atmosphere;
E. isolating said vapor refrigerant in a condensed phase in said second space from said first space;
F. transferring heat from said adsorbent material in said first space to the atmosphere to lower the vapor pressure in said first space;
G. allowing at least some of said refrigerant in said second space to flow to said first space through said valve means for at least a sufficient amount of time to cool condensed refrigerant in said second space by flash evaporation to a temperature below that of a thermal sink associated therewith;
H. vaporizing the cooled refrigerant in said second space by extracting heat from said thermal sink to provide the refrigerant's heat of vaporization;
I. allowing the refrigerant vapor produce in step H to go through said valve means into said first space to be readsorbed in said adsorbent material and transferring the resulting heat of adsorption from said first space into the atmosphere.

5. The process of claim 4, wherein the refrigerant is water.

6. The process of claim 4, wherein the thermal sink is the interior of a building.

7. A process for providing heat to a locality using solar radiation as the primary energy source, said process comprising the steps of:
A. providing a solar collector;
B. providing a pressure tight enclosure defining a first space and a second space including connecting conduit means containing valve means, said enclosure containing a working refrigerant, said first space being in thermal communication with said collector and containing an adsorbent material comprising a molecular siene capable of adsorbing said refrigerant exothermically;
C. raising the vapor pressure in said first space and desorbing the refrigerant from the adsorbent material using solar energy;
D. allowing the desorbed refrigerant vapor to flow from said first space into said second space through said valve means and condensing the vapor in said second space by transferring the refrigerant's heat of condensation into the locality;
E. isolating said condensed vapor in said second space from said first space;
F. transferring heat from the adsorbent material to the locality to lower the vapor pressure in said first space;
G. allowing at least some of said refrigerant in said second space to flow into said first space through said valve means for a sufficient amount of time to cool the condensed refrigerant in said second space by flash evaporation;
H. readsorbing refrigerant vapor produced during the flash evaporation in step G. into said adsorbent material and transferring the resulting heat of adsorption from said first space to the locality;
I. vaporizing said condensed refrigerant in said second space;
J. allowing the refrigerant vapor produced in step I. to flow through said valve means to said first space to be readsorbed in said adsorbent material and transferring the resulting heat of adsorption from said first space to the locality.

8. The process of claim 7 wherein the refrigerant is water.

9. An adsorption apparatus for low-grade heat utilization which comprises a solar energy collector, said collector including a first heat exchanger for the thermal conduction of heat thereto and therefrom; a first sealed chamber for adsorbing and desorbing a fluid refrigerant, said first chamber comprising a first hermetically sealed container, a solid adsorbent material comprising a molecular sieve contained in said first container in thermal communication with said first heat exchanger; said refrigerant adapted to be adsorbed and desorbed by said material when said material is respectively heated and cooled by said first heat exchanger; a second sealed chamber comprising a second heremetically sealed container for receiving said refrigerant, means for condensing and evaporating said refrigerant, and a second heat exchanger for exchanging heat between said second chamber and a fluid exterior thereto; valve means, opposite sides of which are in communication between said chambers; said apparatus operable to effect an intermittent heat pump cycle to deliver and extract heat which is energized by the corresponding intermittent receipt of solar energy by said collector.

10. Apparatus in accordance with claim 9, wherein said material comprises molecular sieve zeolite.

11. Apparatus in accordance with claim 10, wherein said refrigerant is water.

12. Apparatus in accordance with claim 10, wherein said material is substantially only in said first container.

13. Apparatus in accordance with claim 12, wherein said first heat exchanger comprises a honeycomb structure which surrounds said material.

14. Apparatus in accordance with claim 10, wherein said condensing and evaporating means comprises a condenser and a gas expander cooler member.

15. Apparatus in accordance with claim 14, wherein said second heat exchanger comprises a fan and at least part of said condenser.

16. Apparatus in accordance with claim 14, wherein said second heat exchanger comprises at least part of said gas expander cooler member.

17. Apparatus in accordance with claim 16, wherein an expansion valve for said refrigerant is included in said gas expander cooler member.

18. Apparatus in accordance with claim 10, wherein said valve means comprises a one-way valve from said first chamber to said second chamber which is controlled to open when the pressure in said first chamber builds up to a selected amount.

19. A process for obtaining usable thermal energy on a cyclic basis comprising the steps of:
   a. providing a pressure tight enclosure that is defined by a first space, a second space, and connecting conduit means between said spaces, and further providing in said enclosure a working refrigerant and an adsorbent material at least in said first and second spaces into which said refrigerant may be adsorbed and desorbed;
   b. heating said adsorbent material in said first space sufficiently to desorb said refrigerant therefrom and to raise the vapor pressure in said first space;
   c. allowing the desorbed refrigerant vapor upon being raised by said heating step to a predetermined pressure to flow from said first space into said second space through said connecting conduit means and condensing said desorbed refrigerant vapor by removing the refrigerant's heat of condensation therefrom;
   d. receiving said now liquid refrigerant with said heat of condensation removed therefrom in said second space;
   e. cooling said adsorbent material in said first space sufficiently for it to adsorb vapor of said refrigerant therein and to reduce vapor pressure in said first space so that it is lower by a predetermined amount than the vapor pressure in said second space;
   f. allowing the refrigerant received in step d in said second space to be drawn into said adsorbent material in first space through said connecting conduit means and removing thermal energy from said refrigerant that proximately results from said refrigerant being adsorbed by said adsorbent material in said first space; and
   g. cyclically repeating steps a-f whereby usable thermal energy is generated sequentially by reason of said refrigerant being first desorbed from said adsorbent material in said first space and then being adsorbed by said adsorbent material in said first space.

20. A process in accordance with claim 19 wherein valve means are provided in said connecting conduit means for performing the functions of preventing said refrigerant vapor from flowing between said spaces except upon the existence of predetermined pressure differentials between said spaces.

21. A process in accordance with claim 19 which comprises the further step of heating said refrigerant after it has been received in said second space.

22. A process in accordance with claim 19 wherein said refrigerant is composed of $H_2O$.

23. A process in accordance with claim 19 wherein said adsorbent material is composed of zeolite.

24. An adsorption apparatus for low-grade heat utilization which comprises a solar energy collector, said collector including a first heat exchanger for the thermal conduction of heat thereto and therefrom; a first sealed chamber for adsorbing and desorbing a fluid refrigerant, said first chamber comprising a first hermetically sealed container, a solid adsorbent material comprising zeolite contained in said first container in thermal communication with said first heat exchanger; said refrigerant adapted to be adsorbed and desorbed by said material when said material is respectively heated and cooled by said first heat exchanger; a second sealed chamber comprising a second hermetically sealed container for receiving said refrigerant, said second chamber containing means for condensing and evaporating said refrigerant, and a second heat exchanger for exchanging heat between said second chamber and a fluid exterior thereto; valve means, opposite sides of which are in communication between said chambers; said apparatus operable to effect an intermittent heat pump cycle to deliver and extract heat which is energized substantially entirely by the corresponding alternating receipt and non-receipt of solar energy by said collector.

25. Apparatus in accordance with claim 24, wherein said refrigerant is water.

26. Apparatus in accordance with claim 24, wherein said material is substantially only in said first container.

27. Apparatus in accordance with claim 26, wherein said first heat exchanger comprises a honeycomb structure which surrounds said material.

28. Apparatus in accordance with claim 24, wherein said condensing and evaporating means comprises a condenser and an evaporator.

29. Apparatus in accordance with claim 28, wherein said second heat exchanger comprises a fan and at least part of said condenser.

30. Apparatus in accordance with claim 28, wherein said second heat exchanger comprises at least part of said evaporator.

31. Apparatus in accordance with claim 30, wherein an expansion valve for said refrigerant is included in said evaporator.

32. Apparatus in accordance with claim 24, wherein said valve means mans comprises a one-way valve from said first chamber to said second chamber which is controlled to open when the pressure in said first chamber builds up to a selected amount.

* * * * *